May 24, 1932.  A. McMULLEN  1,859,405
TRAP
Filed Feb. 17, 1931   2 Sheets-Sheet 2
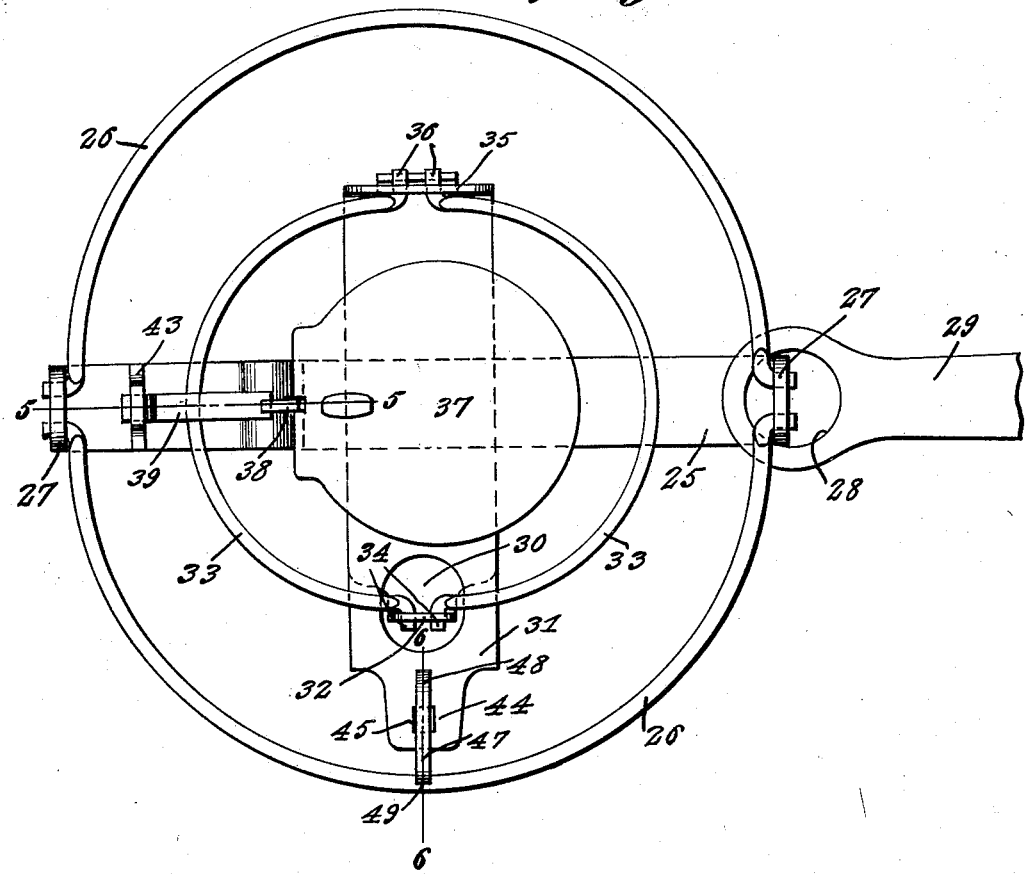
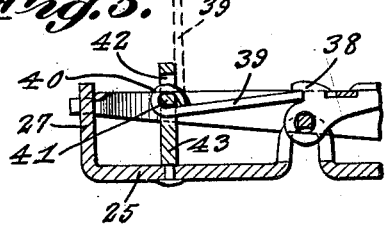
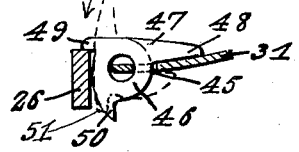
Allen McMullen, INVENTOR
BY Victor J. Evans
and Co. ATTORNEY Patented May 24, 1932

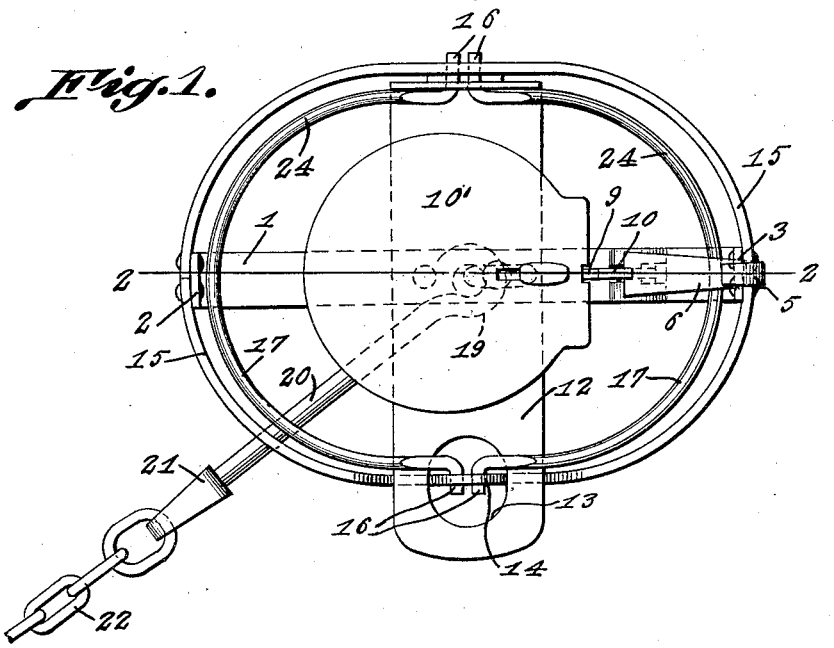
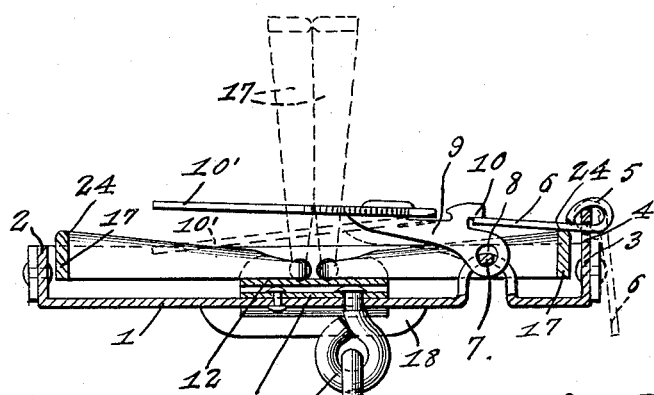
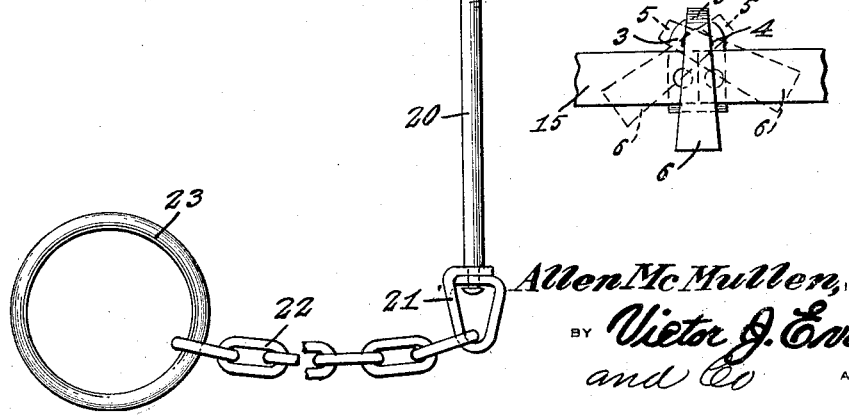

1,859,405

UNITED STATES PATENT OFFICE

ALLEN McMULLEN, OF NUMBER FOUR, NEW YORK

TRAP

Application filed February 17, 1931. Serial No. 516,377.

From long experience I have found a number of deficiencies which, except in the present type of both single and double spring jaw traps for fur-bearing animals, permit of an animal escaping from the trap and which also render the traps hard to set. Among these defects may be recited the following: First—The rigid connection between the chain and trap permits of a trapped animal winding the chain around the stake so that the trap is held in firm or rigid condition which will permit of the animal either gnawing or breaking his leg and thus escape, or which will permit of the jaws of the trap being brought against an object with such force as to open the jaws and allow the animal to escape. Second—The traps are not provided with a guard and, therefore, the traps are not always arranged at a proper position for the springing of the jaws when the pan is moved and the pan may be swung by brush or the like blowing thereagainst. Third—The trigger for the pan is not loosely associated with the trap, is liable to become rusted and can not be freely swung to engagement with the keeper of the pan. Fourth—In double jaw traps the trigger, which is swung over one of the inner jaws to engage the keeper thereon is so mounted on the post that the same can also swing between the outer jaws, thus rendering this type of traps extremely difficult to set and, Fifth—The spring for the inner jaws of a double trap has on its upper arm a pivoted button that is swingable over one of the outer jaws when the trap is set. The button soon becomes rusted so that the same cannot be freely turned and this also complicates the setting of a double trap.

It is, therefore, my object to present a trap construction which will successfully overcome the above recited objections.

It is also my object to provide means for overcoming the above mentioned deficiencies in ordinary spring jaw traps which may be readily attached to and form part of such traps.

The above objects and many others which will be apparent as the nature of the invention is better understood may be accomplished by a simple construction and arrangement of parts, satisfactory embodiments of which are disclosed by the accompanying drawings.

In the drawings:

Figure 1 is a top plan view of a single jaw trap in accordance with this invention.

Figure 2 is a sectional view approximately on the line 2—2 of Figure 1.

Figure 3 is a detail elevation to illustrate the loose connection between the keeper and the eye support therefor.

Figure 4 is a top plan view of a double trap provided with the improvement.

Figure 5 is a sectional view approximately on the line 5—5 of Figure 4.

Figure 6 is a detail sectional view approximately on the line 6—6 of Figure 4.

In the drawings and referring particularly to Figures 1 to 3 thereof, the numeral 1 designates a base plate which has its ends bent or upset in the same direction, as indicated by the numerals 2 and 3. The end 3 is of a greater height than the end 2 and has its upper edge rounded and provided with an elliptical opening 4 for the eye end 5 of a trigger plate 6. The trigger is freely mounted on the end 3 of the base 1 and may be swung to any of the angular positions disclosed by Figure 3 of the drawings. The trigger is, therefore, freely swingable and is not subjected to rust which interferes with the free swinging of the trigger in the ordinary type of traps, the trigger being made of rust-proof material.

The base 1, inward with respect to the end 3, is formed with an upstanding rounded portion which, except for the center thereof, is cut-away, the said center affording a bar or pin 7 that is freely received through a round or elliptical opening 8 in the rounded and depending end of the treadle plate 9 of the keeper 10 for the trigger 6. The treadle plate 9 is provided with the usual lug that passes through an opening in the pan 10 and thereafter the said lug is headed to rigidly secure the same to the pan.

The base 1 has centrally and transversely secured thereto the lower arm 11 of a double armed spring, the upper arm of which is indicated by the numeral 12. The upper arm has one end extended beyond the lower arm and is provided with the usual elongated opening 13 which, in the present instance, receives therethrough, when the trap is set, an upstanding ear 14 formed centrally on the depressed upper edge of one of the side members of the substantially elliptical guard 15. The guard 15 is arranged around the base and is riveted or otherwise secured to the outer faces of the upstanding ends 2 and 3 of the base. The ear 14 and the portion of the guard diametrically opposite said ear have spaced round openings therethrough for the offset ends of trunnions 16 of the arched jaws 17, respectively. One of the jaws is designed to have swung thereover the trigger 6 which engages with the keeper 10 when the trap is set, this being, of course, ordinary to such type of traps. The guard 15, below the ear 14 and at the side thereof diametrically opposite the ear is formed with depending portions 18, respectively which are in the nature of what may be termed shoes and which rest on the ground surface and, if desired, hold the trap at an angle or permit of the pan being arranged at a horizontal position when the trap is set. Swivelly connected to the base 1 and to the lower arm 11 of the spring there is an eye member 19 to which is connected the usual eye end of a rod 20. The outer end of the rod has swivelly connected thereto an eye or bail 21 to which is attached one of the end links of a chain 22, the second end link of the chain being provided with the usual ring 23 through which the holding stake is passed.

The swivel connection between the trap and the chain, as well as the guard for the chain are important features of the construction described. An animal caught in the trap will, in his movement, simply turn the trap on the eye or swivel 19 should the shoes 18, which bite into the ground surface permit such movement of the trap. The shoes serve as obstructing elements for preventing the animal moving the trap to wind the chain around the stake, but even should this be successful the trap is not retained in a rigid condition but will swing on the swivel 19, so that the animal can obtain no firm purchase which would otherwise permit him to break his leg and thus escape from the trap were the trap held from free turning movement. Another very important feature of the trap construction resides in the rounding of the confronting or biting edges of the jaws 17, as disclosed by the drawings and indicated by the numeral 24 thereon. The confronting edges of the ordinary trap jaws are straight, that is, the corners thereof are not round. These sharpened corners have a biting effect upon the leg of the trapped animal during his movement of his said leg, so that the bone may be easily severed and the animal can thus escape. With my improvement the rounded edges simply serve as fulcrum elements that will permit of the movement of the leg of the animal thereagainst but as the same offers no sharp edges the animal cannot break the bone of his leg when the same is moved between the jaws.

The construction disclosed in Figures 4 to 6 of the drawings has reference to a double trap. To the upstanding ends of the base trap 25 there are journaled the offset ends of trunnions of the outer jaws 26. One of the upstanding ends or ears 27 and the base receives therethrough the eye ends of a double spring 29 which, when expanded, swings the jaws 26 toward each other in the usual manner. The base 25 has approximately centrally fixed thereon the lower and shorter arm 30 of a two arm spring, the outer arm being indicated by the numeral 31. The spring is arranged transversely with respect to the base and the lower arm 30 (which may be in the nature of a rigid plate) has its free end reduced and formed with an upstanding ear 32 provided with openings in which are journaled the offset rounded and reduced ends or trunnions 44 formed on one of the ends of the arched inner jaws 33. There is secured to the opposite end of the lower arm or plate 30 or there may be formed therewith an upstanding ear 35 having spaced openings through which are journaled the trunnions 36 on the second ends of the inner jaws 33. The ear 32 extends through an enlarged elliptical opening in the spring arm 31.

The pan is indicated by the numeral 37 and has fixed thereto in the ordinary manner the body plate of the keeper 38. The keeper is designed to be engaged by a trigger plate 39 of the usual construction. The trigger plate has an eye end 40 that receives therethrough a transversely arranged lug or pin 41 formed centrally in an elongated round or elliptical opening 42 in a post 43 that is fixed to the base 25. The mounting of the trigger is one of the important features of the present invention. Ordinarily the trigger is so mounted that the same can be swung between the outer jaws 26 which materially interferes with the setting of the trap. With my construction, and especially by reference to Figure 5 of the drawings it will be seen that the body of the trigger, when the same is swung upwardly, will contact with the inner face of the post 43 and cannot swing thereover.

The spring arm 31 has its outer and free end provided with the usual reduced extension 44. Ordinarily there is pivotally mounted on this extension a button which is swingable over one of the outer jaws 26. The button and the pivot therefor are easily rusted so that it is only with extreme difficulty that the button can be brought to jaw-engaging position. The catch element, which I employ in lieu of the button, cannot become rusted to an extent that will prevent the free operation thereof and also the catch member is automatically operated when one of the jaws 26 is swung to open position.

The end 44 of the spring arm 31 has an elongated opening 45 therethrough to freely receive therethrough the rounded body portion 46 of a catch 47. The body 46 is provided with a round opening through which the outer end of the part 44 of the spring arm 31 is received. The catch has extending from its body an arm 48 and its body has its upper edge directly opposite the arm 48 formed with an outwardly extending lug 49 and also formed with a second lug 50 and an arched or rounded wall 51 between the lugs 49 and 50. When the jaw 26 is swung to open position the under face of the said jaw will contact with the outer face of the lug 49, thus swinging the catch to the dotted line position disclosed in Figure 6 of the drawings. The inner shoulder provided by the lug 50 will contact with the part 44 of the spring arm 31, thus holding the finger 48 in an upstanding position. It should be stated that the outer edge of the finger, body and lug 49 are arched. The jaw, when swung below the lug 49 permits of the catch, incident to the weighted portion thereof provided by the finger 48, automatically swinging to initial position to bring the finger over the end 44 of the spring arm 31 to bring the under face of the lug 49 to a position to be contacted by the outer and active edge of the jaw 26. The simplicity and advantages of this particular construction will be understood and appreciated by trappers and manufacturers of traps.

My improvement it will be noted may be readily attached to spring jaw traps of the ordinary construction. The improvements are of a simple nature, which may be cheaply manufactured and readily attached to ordinary types of traps and the advantages of my constructions will be fully understood by those skilled in the art to which said invention relates. I desire it understood, however, that I do not wish to be restricted to the precise details herein set forth and, therefore, hold myself entitled to make such changes therefrom as fairly fall within the scope of what I claim.

Having described the invention, I claim:

1. A double jaw spring trap for fur-bearing animals including a base having upstanding ends on which the ends of the outer jaws are journaled and one of said ends receiving therethrough the eyes of the double spring, a double spring member arranged transversely of and secured to the base, the lower arm of the spring being shorter than the upper arm and the upper arm having an elongated opening therethrough, ears on the lower arm, inner jaws having trunnions on their ends journaled through the ears and one of said ears designed to pass through the opening in the upper spring arm, a pan between the inner jaws having a keeper attached thereto, which is loosely pivoted to the base, an upstanding post on the base having an opening therethrough and a lug element arranged centrally in the opening, a keeper plate having an eye portion which is swingably attached to the element and designed to engage with the keeper and to contact therewith, when out of such engagement to hold the said keeper from movement between the outer jaws, and a latch member loosely carried by the upper spring designed to be automatically contacted by and to engage with one of the outer jaws for holding the outer jaws open.

2. A double spring jaw trap for fur-bearing animals including a base having upstanding ends on which the ends of the outer jaws are journaled and one of said ends receiving therethrough the eyes of the double spring, a double spring member arranged transversely over and secured to the base, the lower arm of the spring being shorter than the upper arm and the upper arm having an elongated opening therethrough, ears on the lower arm, inner jaws having trunnions on their ends journaled through the ears and one of said ears designed to pass through the opening in the upper spring arm, a pan between the inner jaws having a keeper attached thereto, which is loosely pivoted to the base, an upstanding post on the base having an opening therethrough and a lug element arranged centrally in the opening, a keeper plate having an eye portion which is swingably attached to the element and designed to engage with the keeper and to contact therewith, when out of such engagement to hold the said keeper from movement between the outer jaws, a latch including a rounded body which is freely mounted on the lower arm of the upper transverse spring and which includes a weighted finger and spaced lugs, one of said lugs designed to be contacted by one of the outer jaws for swinging the latch to permit of the said jaw passing beneath and thereafter to be engaged by one of the lugs, and the other lug when the latch is swung designed to contact with the upper end of the spring for holding the keeper from outward movement.

In testimony whereof I affix my signature.

ALLEN McMULLEN.